(12) United States Patent  (10) Patent No.: US 8,753,080 B2
Morimoto  (45) Date of Patent:  Jun. 17, 2014

(54) UPWIND WIND TURBINE AND OPERATION METHOD THEREOF

(75) Inventor: Masafumi Morimoto, Tokyo (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 987 days.

(21) Appl. No.: 12/810,174

(22) PCT Filed: May 23, 2008

(86) PCT No.: PCT/JP2008/001288
§ 371 (c)(1),
(2), (4) Date: Jun. 23, 2010

(87) PCT Pub. No.: WO2009/084123
PCT Pub. Date: Jul. 9, 2009

(65) Prior Publication Data
US 2010/0301607 A1  Dec. 2, 2010

(30) Foreign Application Priority Data

Dec. 28, 2007 (JP) ................................. 2007-339280

(51) Int. Cl.
*F03D 7/04* (2006.01)

(52) U.S. Cl.
USPC ........ 416/1; 416/37; 416/41; 416/47; 416/61; 416/142; 416/156; 416/169 R

(58) Field of Classification Search
USPC .......... 415/1, 4.1, 4.3, 4.5, 16, 17, 30, 33, 34; 416/1, 37, 38, 40, 41, 43, 44, 47, 61, 416/131, 135, 136, 139, 142, 143, 156, 416/169 R, 205, 206, DIG. 4, 157 R
See application file for complete search history.

(56) References Cited

U.S. PATENT DOCUMENTS 5,564,274 A * 10/1996 Denbraber et al. ............. 60/329
7,071,578 B1    7/2006 Shibata et al.
(Continued)

FOREIGN PATENT DOCUMENTS

JP   56-092371   7/1981
JP   2004108162  4/2004
(Continued)

OTHER PUBLICATIONS

ISA Japan, International Search Report of PCT/JP2008/001288, Jul. 15, 2008, 1 page.

*Primary Examiner* — Christopher Verdier
(74) *Attorney, Agent, or Firm* — Alleman Hall McCoy Russell & Tuttle LLP

(57) ABSTRACT

An upwind wind turbine includes a tilting coupling mechanism configured to couple base end portions of blades to a hub such that the blades can tilt between a normal position and a retracted position in which the blades are tilted in a downwind direction relative to the normal position. The upwind wind turbine also includes a tilting drive operating in association with the tilting coupling mechanism to switch the positions of the blades and a rotation stop to stop the rotation of the rotor. When the blades are switched to the retracted position, the rotation stop is actuated to stop the rotor in a predetermined rotational position in which the blades can tilt without interference with the tower, and the tilting drive is actuated to tilt the blades to the retracted position after stop of the rotation of the rotor.

18 Claims, 17 Drawing Sheets

(56) References Cited

U.S. PATENT DOCUMENTS

| | | |
|---|---|---|
| 7,891,944 B2 * | 2/2011 | Jeppesen et al. .................. 416/1 |
| 2004/0052640 A1 | 3/2004 | Khan |
| 2005/0200134 A1 | 9/2005 | Shibata et al. |
| 2005/0200135 A1 | 9/2005 | Shibata et al. |
| 2005/0207889 A1 | 9/2005 | Shibata et al. |
| 2005/0207890 A1 | 9/2005 | Shibata et al. |
| 2009/0047129 A1 * | 2/2009 | Yoshida ............................ 416/9 |
| 2009/0185902 A1 * | 7/2009 | Romero Vergel et al. ...... 416/47 |

FOREIGN PATENT DOCUMENTS

| | | |
|---|---|---|
| JP | 2004108163 | 4/2004 |
| JP | 2005264865 | 9/2005 |
| JP | 2007064062 | 3/2007 |

* cited by examiner

UPWIND WIND TURBINE AND OPERATION METHOD THEREOF

TECHNICAL FIELD

The present invention relates to an upwind wind turbine and an operation method thereof. In particular, the present invention relates to an upwind wind turbine and an operation method thereof which reduce a wind load applied to plural blades to improve a wind pressure resistance of the wind turbine when a strong wind is blowing.

BACKGROUND ART

Typically, a horizontal-axis wind turbine includes a tower extending vertically, a nacelle which is attached to the upper end portion of the tower such that the nacelle is horizontally rotatable, and a rotor which is rotatably mounted to the nacelle. The rotor includes a hub provided at a center portion thereof, and plural blades which are attached to the hub and are rotatable within a substantially vertical operation plane. The horizontal-axis wind turbine is classified into an upwind wind turbine including blades directed upwind during power generation and a downwind wind turbine including blades directed downwind during power generation.

A wind load applied to a wind turbine while a strong wind is blowing, for example, in a typhoon, is a main factor for determining strength of a structure of the wind turbine. A ratio of the wind load applied to the blades to the wind load applied to the wind turbine is particularly high. Therefore, by reducing the wind load applied to the blades, a wind pressure resistance of the wind turbine can be improved without increasing a cost to ensure strength of the structure. Various techniques have been proposed to reduce the wind load applied to the blades.

Patent document 1 discloses an upwind wind turbine. This wind turbine is placed in an upwind position in which all blades are directed upwind during power generation. When an anemometer detects a wind speed which is not lower than a cut-out wind speed, all of the blades are switched to be feathered and the rotor stops. Then, the nacelle yaws in a range of 75 to 110 degrees and all of the feathered blades are switched to be reversed. Then, the nacelle yaws and this wind turbine is placed in a downwind position in which all of the blades are directed downwind.

Patent document 2 discloses a downwind wind turbine. This wind turbine includes a blade tilting mechanism for adjusting tilting angles of the blades to tilt the blades in a downwind direction to reduce a blade passage area while a strong wind is blowing. This makes it possible to reduce the wind load applied to the blades without stopping a power generation operation of the wind turbine.

Patent document 3 discloses a downwind wind turbine. This wind turbine includes a blade tilting mechanism for adjusting tilting angles of blades to change tilting angles of the blades according to an average wind speed detected by an anemometer. This makes it possible to reduce the wind load applied to the blades without stopping a power generation operation of the wind turbine and to adjust a blade passage area to increase an output power of the wind turbine.

Patent document 1: Japanese Laid-Open Patent Application Publication No. 2007-064062
Patent document 2: Japanese Laid-Open Patent Application Publication No. 2004-108162
Patent document 3: Japanese Laid-Open Patent Application Publication No. 2004-108163

DISCLOSURE OF THE INVENTION

Problems to be Solved by the Invention

However, according to Patent document 1, since the blades are switched from the upwind position to the downwind position while a strong wind is blowing, it is necessary to supply an electric power to a device for yawing the nacelle. Therefore, there is a need for an auxiliary electric power supply such as a battery to enable the nacelle to yaw in case of an electric power failure under a strong wind.

Furthermore, when the position of the blades is switched, the nacelle yaws. For this reason, it is necessary to ensure strength of a structure of the blades and a structure of a coupling portion between the blades and the hub to withstand a cross wind applied thereto during the yawing of the nacelle. In addition, it is difficult to yaw the nacelle against a wind load to direct the respective blades downwind while a strong wind is blowing.

Patent documents 2 and 3 merely disclose the downwind wind turbine which can reduce a wind load applied to the blades during a power generation operation under a strong wind. There may be a chance that the blades collide against the tower and are damaged if the techniques disclosed in these documents are applied to the upwind wind turbine.

In aerodynamics, it is desired that the nacelle face the wind and the blades always retain the upwind position with an angle of attack of 0 degree, to reduce the wind load. This is because the blades are generally designed to have a shape with a high lift-to-drag ratio, and substantially no wind load is applied to the blades in a fully upwind position if the angle of attack is zero. On the other hand, if the angle of attack is not zero, a great lift and a great drag are generated in the blades, significantly increasing a load. As disclosed by the techniques disclosed in No. '162 and No. '163, it is possible to reduce the wind load by tilting the blades to reduce a visible face area (projected area) of the blades when viewed from an upwind side. However, the effect of reducing the load which is achieved by these techniques is much less than the above mentioned effect achieved by retaining the position as described above. Therefore, in a state where a wind direction easily changes and an electric power failure may occur under a strong wind, the wind load is very effectively reduced by automatically retaining the blades in the upwind position.

However, in the past, the following techniques have not been proposed: a technique in which power generation stops under a strong wind and blades are retained in the upwind position and tilted, in the upwind wind turbine; a technique for automatically switching the position of the blades in case of an electric power failure or the like, in the upwind wind turbine; and a technique for restricting a tilting speed of the blades when the position of the blades is switched, in the upwind wind turbine.

An object of the present invention is to switch a plurality of blades to a retracted position in which the blades are tilted in a downwind direction without damaging the blades under a strong wind, etc. Another object of the present invention is to switch the position of the blades while retaining the upwind position of the blades, to automatically tilt the blades, to automatically retain the upwind position, to restrict a tilting speed of the blades, etc.

Means for Solving the Problem

An upwind wind turbine of the present invention, including a nacelle horizontally rotatably attached to a tower, a rotor rotatably attached to the nacelle, a hub which is provided at a center portion of the rotor and forms a part of the rotor, a plurality of blades which are attached to the hub, form a part of the rotor and are rotatable within a substantially vertical operation plane, and a yawing drive device configured to yaw the nacelle to direct the blades upwind, comprises a tilting coupling mechanism configured to couple base end portions of the blades to the hub such that the blades tilt between a normal position in which the blades are present within the operation plane and a retracted position in which the blades are tilted in a downwind direction relative to the normal position, a tilting drive means configured to operate in association with the tilting coupling mechanism to switch positions of the blades; a rotation stop means configured to stop rotation of the rotor, and a control means configured to actuate the rotation stop means to stop the rotor in a predetermined rotational position in which the blades tilt without interference with the tower and to actuate the tilting drive means to tilt the blades to the retracted position after stop of the rotation of the rotor, to switch the blades to the retracted position.

In accordance with such a configuration, after stop of the rotor in the rotational position in which the plurality of blades can tilt without interference with the tower, the plurality of blades tilt to the retracted position. Therefore, the position of the blades can be switched without damaging the wind turbine. In the retracted position, the wind load applied to the blades can be reduced, and thus, a wind pressure resistance of the wind turbine can be improved. Therefore, rigidity and strength of the tower and the blades can be advantageously ensured and a manufacturing cost of the wind turbine can be reduced.

The upwind wind turbine may further comprise an anemometer means configured to detect a wind speed, and the control means may be configured to start control for switching the blades to the retracted position, when it is determined that the wind speed detected by the anemometer means is not lower than a predetermined wind speed. In accordance with such a configuration, a wind load applied to the blades under a strong wind can be reduced. In addition, the operation of the wind turbine can be stopped safely under a strong wind.

The upwind wind turbine may further comprise an azimuth angle detector means configured to detect an azimuth angle of the rotor, and the control means may be configured, to detect the predetermined rotational position based on the azimuth angle detected by the azimuth angle detector means and to actuate the rotation stop means, to stop the rotation of the rotor. In accordance with such a configuration, the rotor can be stopped while detecting the azimuth angle. This makes it possible to more surely avoid the blades from interfering with the tower when the blades are tilted after the stop of the rotor.

The rotation stop means may include pitch angle adjusting means for respective of the blades and a rotor braking means configured to brake the rotor. In accordance with such a configuration, since the rotor can be stopped after the rotational speed of the rotor is decreased by adjusting the pitch angles of the blades, a burden on the rotor braking means can be reduced.

To stop the rotation of the rotor, the control means may be configured to actuate the pitch angle adjusting means to adjust pitch angles of the blades to decrease rotational speeds of the blades and to then actuate the rotor braking means to brake the rotor to stop the rotation of the rotor. In accordance with such a configuration, rotation of the rotor can be quickly stopped and the rotor can be stopped safely.

The control means may be configured to actuate the tilting drive means to tilt the blades by a wind load applied to the blades and weights of the blades, to tilt the blades to the retracted position. In accordance with such a configuration, the blades can be switched to the retracted position without supplying an electric power from an electric power supply system or an auxiliary electric power supply such as a battery.

In a state where the blades are placed in the retracted position, a resultant force center of the wind load applied to the plurality of blades may be located downwind relative to a center axis of the tower. In such a configuration, in the state where the blades are in the retracted position, the nacelle and the rotor automatically yaw like a weathercock so that the front end of the rotor faces upwind, by the wind load applied to the plurality of blades. Therefore, in the state where the blades are in the retracted position, the blades can be retained in the upwind position without supplying the electric power from the electric power supply system or the auxiliary electric power supply such as the battery.

The upwind wind turbine may further comprise a yawing braking means configured to brake yawing of the nacelle, and the control means may be configured to deactuate the yawing braking means in a state where the blades have reached the retracted position. In accordance with such a configuration, in a state where the blades are placed in the retracted position, the nacelle and the rotor yaw smoothly by the wind load applied to the blades.

The tilting drive means may include a single double-acting hydraulic cylinder configured to be extended and contracted to tilt the plurality of blades, a first oil passage and a second oil passage which are connected to a pair of oil chambers of the hydraulic cylinder, respectively, a connecting oil passage connecting the first oil passage to the second oil passage, and an electromagnetic on-off valve provided on the connecting oil passage. In accordance with such a configuration, upon the electromagnetic on-off valve being opened to open the connecting oil passage, communication is provided between the oil chambers of the hydraulic cylinder and the hydraulic cylinder is extended and contracted. Thus, the blades can tilt.

The electromagnetic on-off valve may be a normally-open valve. In accordance with such a configuration, since the electromagnetic on-off valve is opened when no electric power is supplied thereto, the blades can be automatically switched to the retracted position during an electric power failure or the like.

The tilting drive means may include a variable throttle valve provided on the first oil passage or the second oil passage. In accordance with such a configuration, the amount of the pressurized oil flowing between the oil chambers is restricted by the throttle valve in a state where the electromagnetic on-off valve is opened. For this reason, the operation speed of the hydraulic cylinder is suppressed, and the tilting speed of the blades can be suppressed to a low speed.

The tilting drive means may include a pressurized oil feed device configured to feed a pressurized oil; and an electromagnetic direction changeover valve connected to the pressurized oil feed device; and the first oil passage and the second oil passage may be connected to the electromagnetic direction changeover valve. In such a configuration, feeding of the pressurized oil to the hydraulic cylinder can be controlled with a simple configuration.

The tilting drive means may include a plurality of double-acting hydraulic cylinders which are configured to be extended and contracted to tilt the associated blades, respectively, and a synchronous operation means configured to operate the plurality of hydraulic cylinders to cause the blades to be synchronously switched to the retracted position by a wind load applied to the blades and weights of the blades. In accordance with such a configuration, the plurality of hydraulic cylinders are operated by the synchronous operation means to synchronously switch the blades to the retracted position during an electric power failure or the like.

The tilting drive means may include a hydraulic pump configured to feed a pressurized oil, and an electromagnetic direction changeover valve provided between the hydraulic pump and the synchronous operation means. Thus, the feeding of the pressurized oil to the respective hydraulic cylinders can be controlled with a simple configuration.

The upwind wind turbine may further comprise a power generator configured to generate an electric power by a rotational driving force of the rotor. In accordance with such a configuration, the electric power can be generated by the rotation of the rotor.

A method of operating an upwind wind turbine, of the present invention, including a nacelle horizontally rotatably attached to a tower, a rotor rotatably attached to the nacelle, a hub which is provided at a center portion of the rotor and forms a part of the rotor, a plurality of blades which are attached to the hub, form a part of the rotor and are rotatable within a substantially vertical operation plane, and a yawing drive device configured to yaw the nacelle to direct the blades upwind, wherein base end portions of the blades are coupled to the hub such that the blades tilt between a normal position in which the blades are present within the operation plane and a retracted position in which the blades are tilted in a downwind direction relative to the normal position, the method comprising: stopping the rotor in a predetermined rotational position in which the blades tilt in a downwind direction without interference with the tower, and tilting the blades to the retracted position after stop of the rotation of the rotor. In such a method, the advantage as described above is achieved.

The upwind wind turbine may be configured such that a resultant force center of the wind load applied to the plurality of blades is located downwind relative to a center axis of the tower, after the tilting of the blades. In such a method, in the state where the blades are placed in the retracted position, the nacelle and the rotor automatically yaw like a weathercock so that the front end of the rotor faces upwind, by the wind load applied to the plurality of blades. Therefore, in the state where the blades are in the retracted position, the blades can be retained in the upwind position without supplying the electric power from the electric power supply system or the auxiliary electric power supply such as the battery.

The upwind wind turbine may include a yawing braking means configured to brake yawing of the nacelle, and the method may further comprise the step of deactuating the yawing braking means after the step for tilting the blades. In such a method, in the state where the blades are placed in the retracted position, the nacelle and the rotor yaw smoothly by the wind load applied to the blades.

The above and further objects and features of the present invention will more fully be apparent from the following detailed description with accompanying drawings.

Effects of the Invention

In accordance with an upwind wind turbine and an operation method thereof of the present invention, it is possible to tilt blades in a downwind direction while preventing interference between the blades and a tower. In addition, the tilted blades can return to the upwind position automatically.

Figure 1:
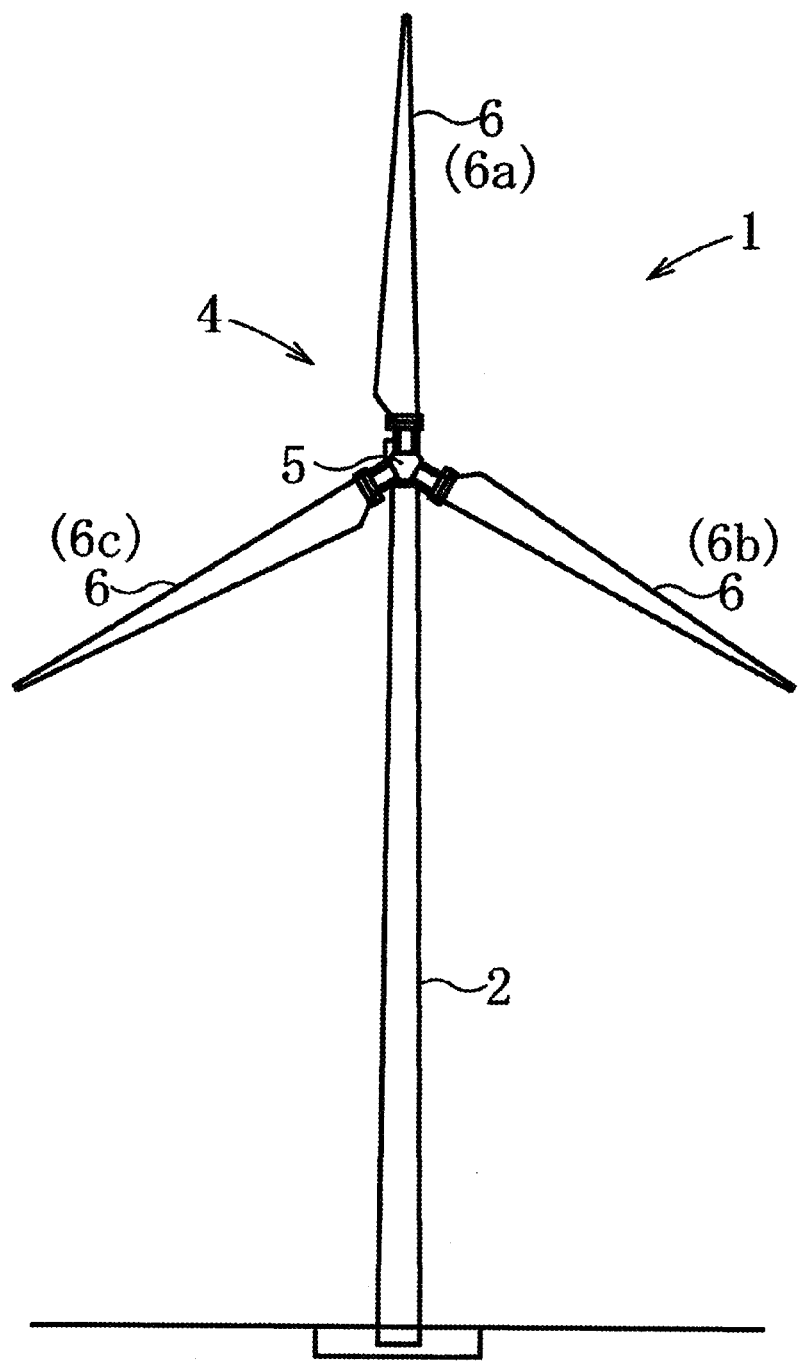
FIG. 1 is a front view of an upwind wind turbine according to Embodiment 1 of the present invention.

EXPLANATION OF REFERENCE NUMERALS 1, 1A upwind wind turbine
2 tower
3, 3A nacelle
4 rotor
5 hub
6 blade
7 pitch adjusting mechanism
15, 70, 80, 90, 190 tilting coupling mechanism
18 rotation stop device
19 yawing drive mechanism
24 yawing braking device
32 rotor braking device
33 azimuth angle detection electromagnetic pickup
37 power generator
40 tilting drive device
41, 41A, 93 hydraulic cylinder
45 oil passage
46 oil passage
47 variable throttle valve
49 electromagnetic on-off valve
51, 101 electromagnetic direction changeover valve
53, 105 hydraulic pump
60 anemometer
62 control unit

BEST MODE FOR CARRYING OUT THE INVENTION

Hereinafter, a best mode for carrying out the present invention will be described with reference to the drawings.

Figure 2:
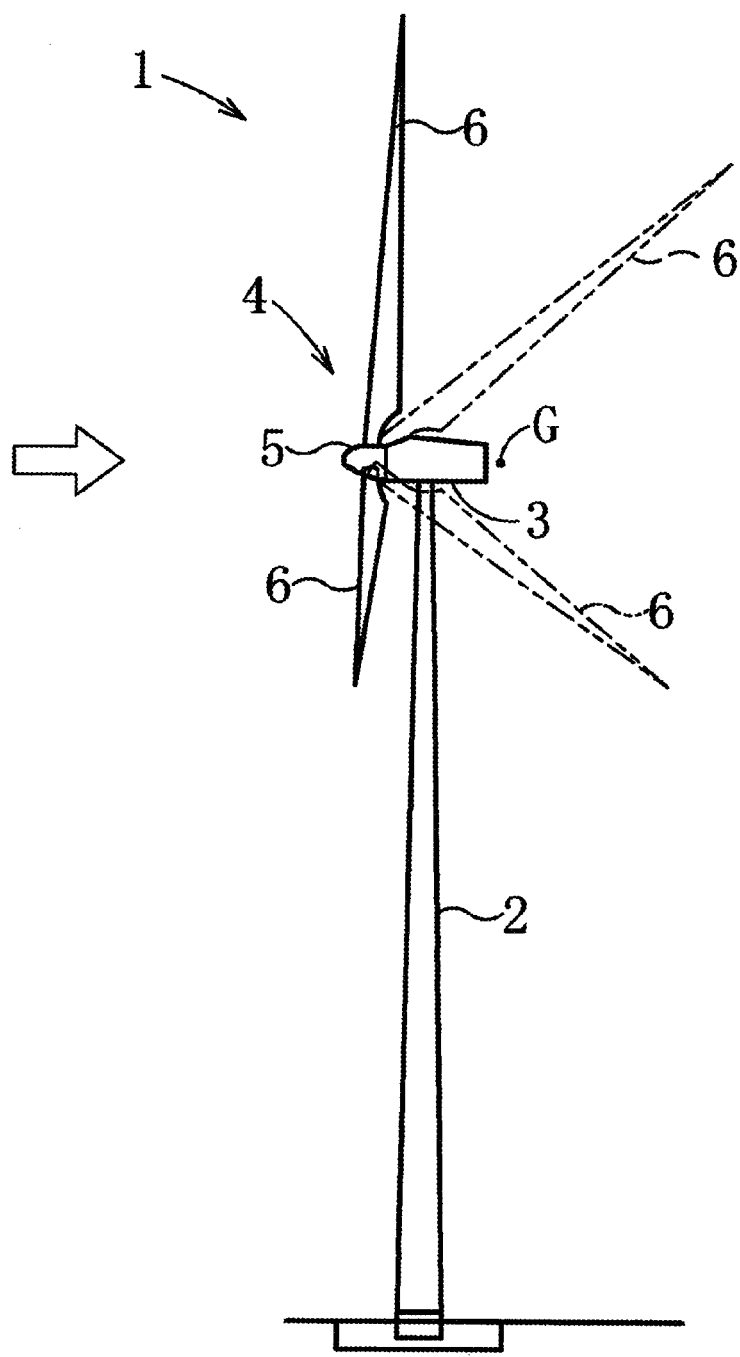
FIG. 2 is a side view of the upwind wind turbine of FIG. 1.

As shown in FIGS. 1 and 2, an upwind wind turbine 1 according to Embodiment 1 of the present invention includes a tower 2 extending vertically. A box-like nacelle 3 is attached to the upper end portion of the tower 2 such that the nacelle 3 is horizontally rotatable. A rotor 4 is rotatably mounted to the nacelle 3. The rotor 4 includes a hub 5 attached to a center portion thereof and three blades 6 which are attached to the hub 5 and are rotatable within a substantially vertical operation plane.

Figure 3:
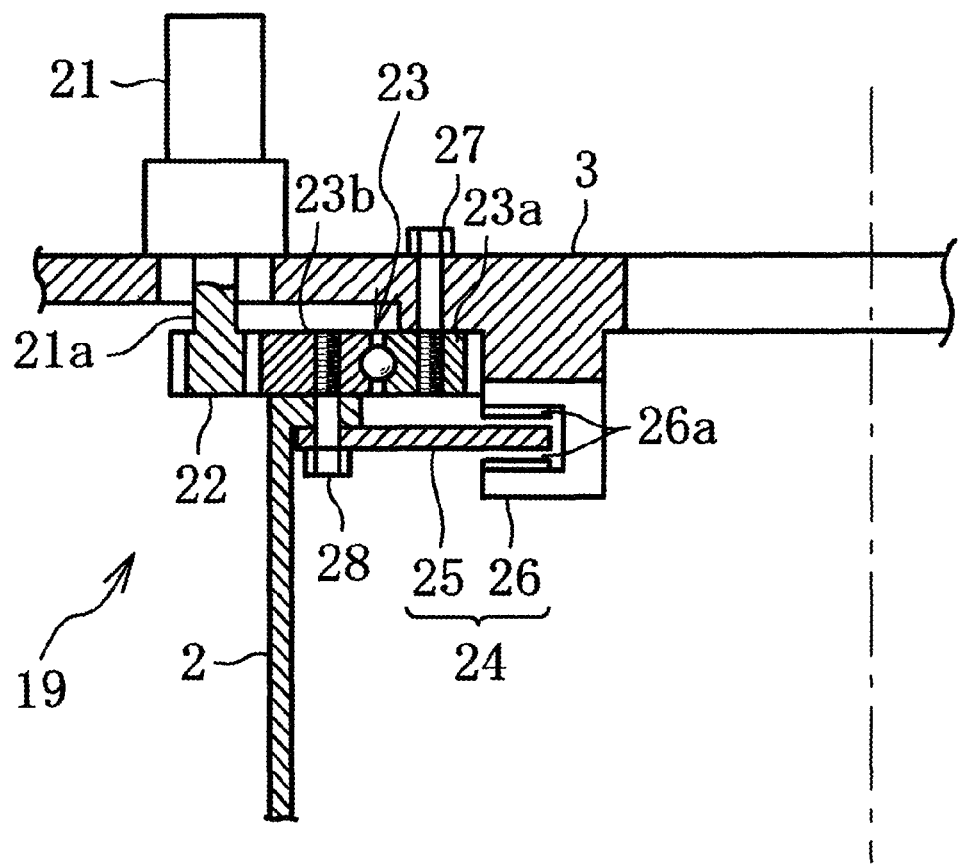
FIG. 3 is a cross-sectional view showing a yawing drive device of the upwind wind turbine of FIG. 1.

As shown in FIG. 3, a yawing drive device 19 is mounted between the tower 2 and the nacelle 3. The yawing drive device 19 includes a yawing drive motor 21, a pinion 22, a radial bearing 23, an annular member 23b and a yawing braking device 24.

The yawing drive motor 21 is fastened to the bottom wall portion of the interior of the nacelle 3. An output shaft 21a of the yawing drive motor 21 protrudes downward relative to the nacelle 3. The pinion 22 is attached to the output shaft 21a. The radial bearing 23 has an annular space. An inner race 23a is provided at the inner peripheral portion of the radial bearing 23 and is fastened to the nacelle 3 by a bolt 27. The annular member 23b is integral with an outer race provided at the outer peripheral side of the radial bearing 23 and is fastened to the upper end portion of the tower 2 by a bolt 28. A gear is formed in the outer peripheral portion of the annular member 23b and is configured to mesh with the pinion 22.

Upon the yawing drive motor 21 rotating, the driving force of the yawing drive motor 21 is transmitted to the pinion 22, which revolves around the outer peripheral side of the annular member 23b. Thereby, the nacelle 3 yaws relative to the tower 2. The yawing drive motor 21 is driven according to a wind direction as described later, to allow the nacelle 3 to yaw so that the blades 6 (see FIG. 2) are directed upwind with the front end of the rotor 4 (see FIG. 2) facing upwind (direction indicated by an arrow in FIG. 2).

The yawing braking device 24 includes an annular brake plate 25 and a plurality of circular-arc brake members 26. The brake members 26 have a U-shaped cross-section and are fixed to the outer bottom portion of the nacelle 3. A pair of upper and lower brake pads 26a are provided on the inner surfaces of the upper wall portion and lower wall portion of each of the brake members 25. The brake plate 25 is fastened to the annular member 23b and the upper end portion of the tower 2 by the bolt 28. A part of the inner peripheral portion of the brake plate 25 is positioned between the pair of brake pads 26a. According to the yawing braking device 24, when actuators (not shown) built into the brake members 26 drive the brake members 26, the lower wall portions of the brake members 26 move up, so that the brake plate 25 is sandwiched between the upper and lower brake pads 26a. As a result, a braking force is generated against the yawing of the nacelle 3.

Figure 4:
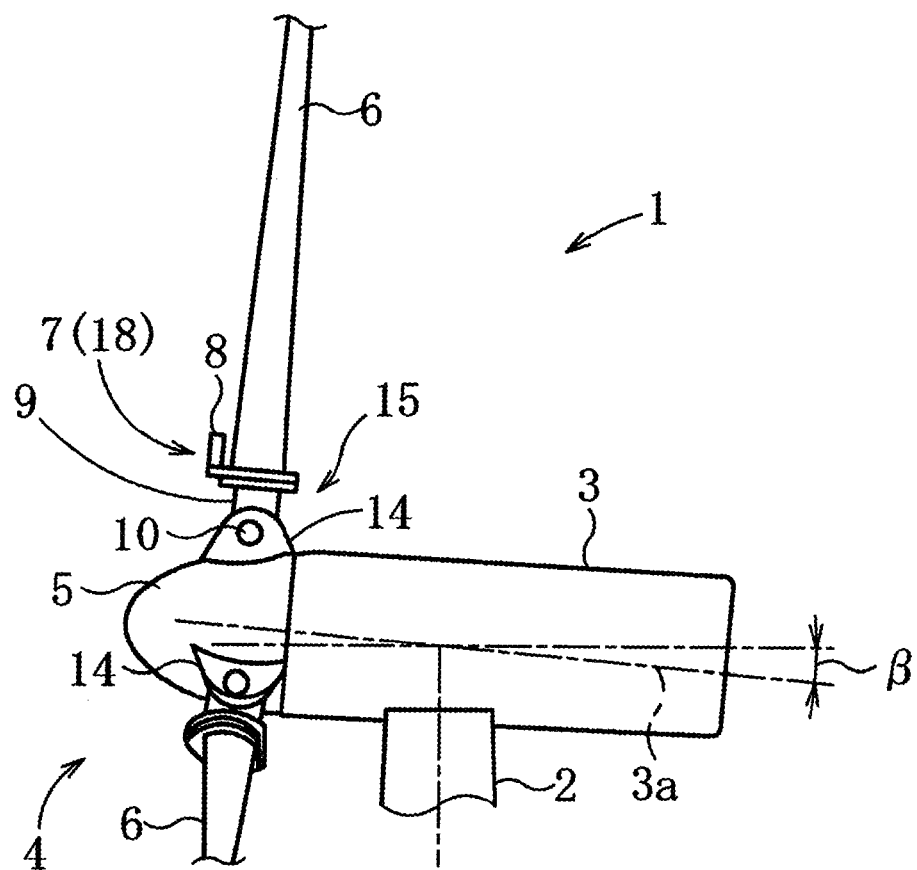
FIG. 4 is a partial side view of the upwind wind turbine, showing major components of FIG. 2 as being enlarged.
Figure 5:
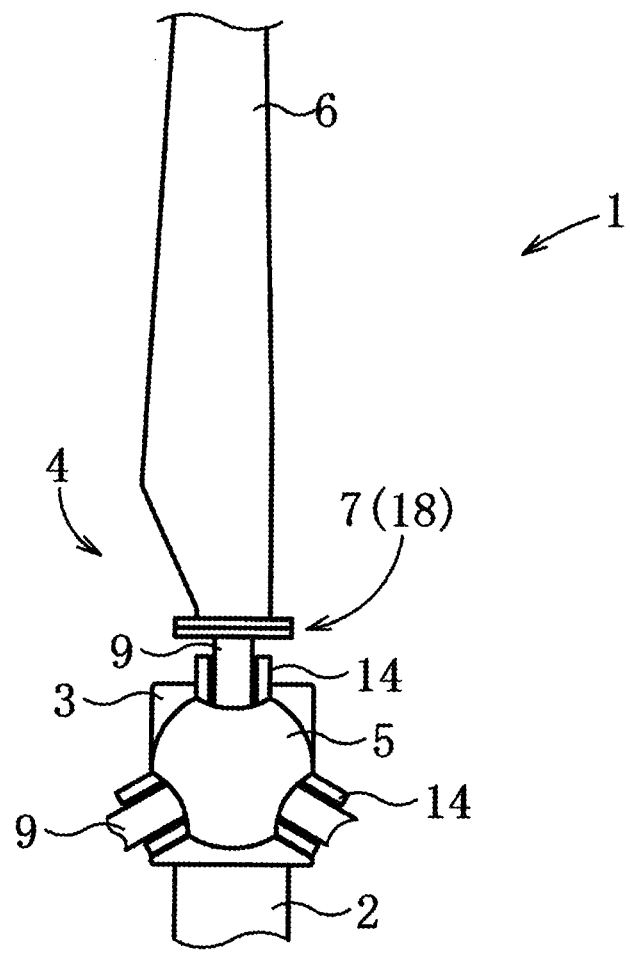
FIG. 5 is a partial front view of the upwind wind turbine, showing major components of FIG. 1 as being enlarged.

As shown in FIGS. 4 and 5, the hub 5 of the rotor 4 is mounted to the front end portion of the nacelle 3. The base end portions of the blades 6 are attached to the outer peripheral portion of the hub 5 via three pivot brackets 14 and three base end members 9 such that the blades 6 can be tilted as described later. A pitch angle adjusting device 7 is provided between the base end side of each blade 6 and the corresponding base end member 9. The pitch angle adjusting device 7 includes a pitch adjusting motor 8. Upon the pitch adjusting motor 8 rotating, each blade 6 rotates around its center axis, so that a pitch angle of each blade 6 is adjusted.

Figure 6:
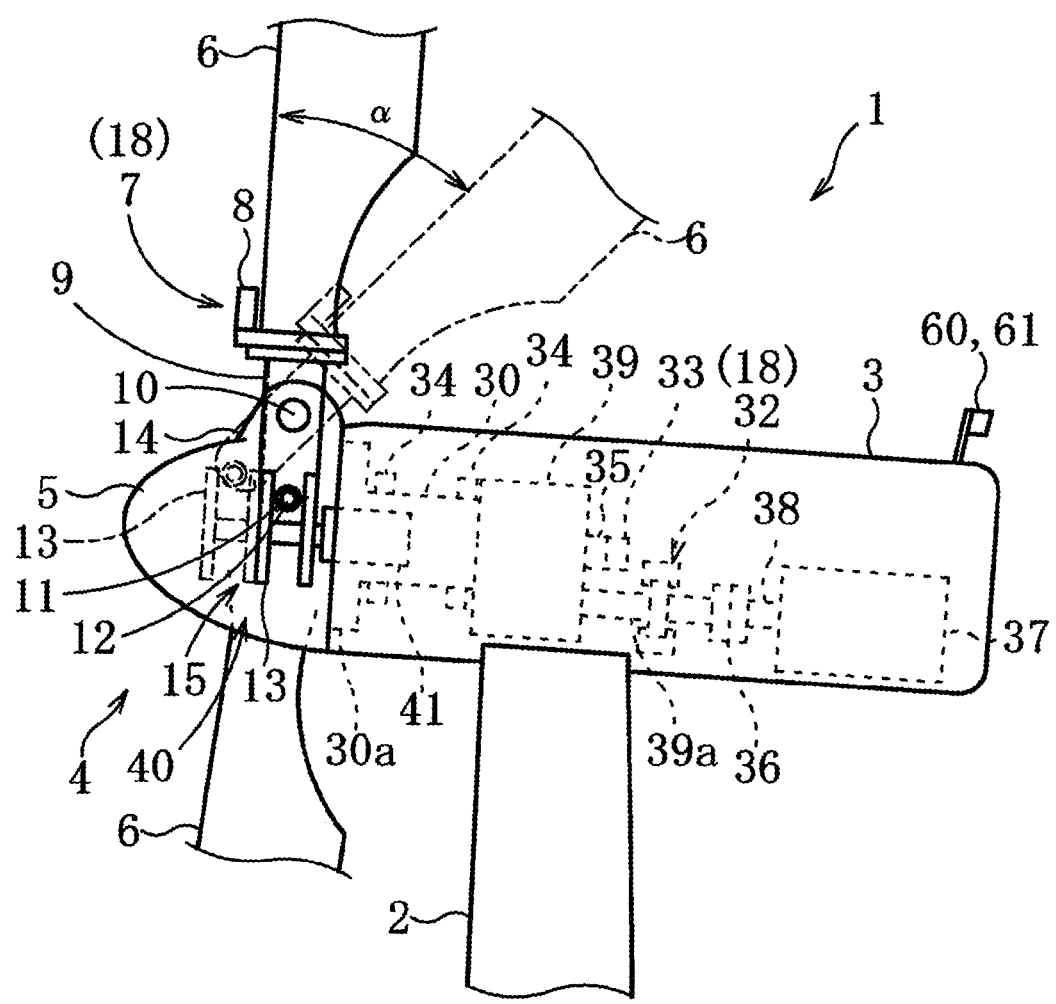
FIG. 6 is a partial side view of the upwind wind turbine, showing major components of FIG. 2 as being enlarged, a part of which is illustrated in a perspective manner.

As shown in FIG. 6, a main shaft 30 of the rotor 4 is rotatably supported by two bearings 34 inside the nacelle 3. The main shaft 30 has a flanged portion 30a at a front end portion thereof. The hub 5 is coupled to the flanged portion 30a. The main shaft 30 is rotatable integrally with the hub 5. The rear end of the main shaft 30 is an input shaft of a gear box 39. An input shaft 38 of the power generator 37 is coupled to an output shaft 39a of the gear box 39 via a coupling 36. Upon the blades 6 rotating, the rotational driving force is input to the power generator 37 via the hub 5, the main shaft 30, the gear box 39 and the coupling 36. The power generator 37 generates an electric power based on the rotational driving force of the rotor 4 input to the power generator 37.

A rotor braking device 32 is attached on the output shaft 39a of the gear box 39. When the rotor braking device 32 is actuated, the output shaft 39a is braked, thereby stopping the rotation of the rotor 4.

A rotary joint 35 is attached on the rear end of the gear box 39 to connect an oil passage to a hydraulic cylinder 41 as described later. An annular detected portion (not shown) having a concave/convex portion which is like gear teeth is formed at the rear end of the rotary joint 35. Inside the nacelle 3, an electromagnetic pickup 33 is provided to face the annular detected portion from behind, to detect an azimuth angle of the rotor 4. An anemometer 60 for detecting a wind speed and a wind vane 61 for detecting a wind direction are attached on the upper surface of the rear end portion of the nacelle 3.

Next, description will be given of a tilting coupling mechanism 15 configured to couple the base end portion of each blade 6 to the hub 5 to enable each blade 6 to tilt between a normal position and a retracted position and a tilting drive device 40 configured to operate in association with the tilting coupling mechanism 15 to switch the position of each blade 6.

As shown in FIG. 6, the tilting coupling mechanism 15 includes the above pivot brackets 14 and base end members 9, pivot pins 10, a roller 11, pins 12, and an engagement member 13. The three pivot brackets 14 extend radially from the outer peripheral portion of the hub 5. Each base end member 9 is pivotally attached to the associated pivot bracket 14 via the pivot pin 10. The base end portion of each base end member 9 is positioned inside the hub 5. The roller 11 is rotatably attached to the base end portion via the pin 12. Inside the hub 5, the engagement member 13 having an annular groove is provided. The roller 11 engages with the annular groove such that the roller 11 can roll. The tilting drive device 40 includes the hydraulic cylinder 41 attached to the front portion of the main shaft 30. The engagement member 13 is provided at the tip end portion of a piston rod 42 of the hydraulic cylinder 41.

When the piston rod 42 moves forward to an advanced position and the hydraulic cylinder 41 is extended, the engagement member 13 moves forward and the roller 11 moves forward while rolling in an upward direction within the annular groove. Therefore, the blade 6 coupled to the roller 11 via the base end member 9 and the pitch angle adjusting device 7 tilts around the pivot pin 10 within a range of a predetermined angle α from the normal position (see solid line in FIG. 6) in which the blade 6 is positioned in a substantially vertical operation plane to a retracted position (see two-dotted line in FIG. 6) in which the blade 6 is tilted in a downwind direction relative to the normal position. When the hydraulic cylinder 41 is contracted, the blade tilts within an angle range from the refracted position to the normal position.

Turning back to FIG. 4, in the state where the blade 6 is in the normal position, the operation plane within which the blade 6 rotates is substantially perpendicular to the center axis of the nacelle 3. To be more specific, a center axis 3a of the nacelle 3 is tilted a predetermined angle β (e.g., 4 degrees) with respect to a horizontal direction such that an upwind portion of the center axis 3a is oriented in an upward direction, and the operation plane within which the blade 6 rotates is tilted approximately the predetermined angle β with respect to a vertical plane.

Figure 7:
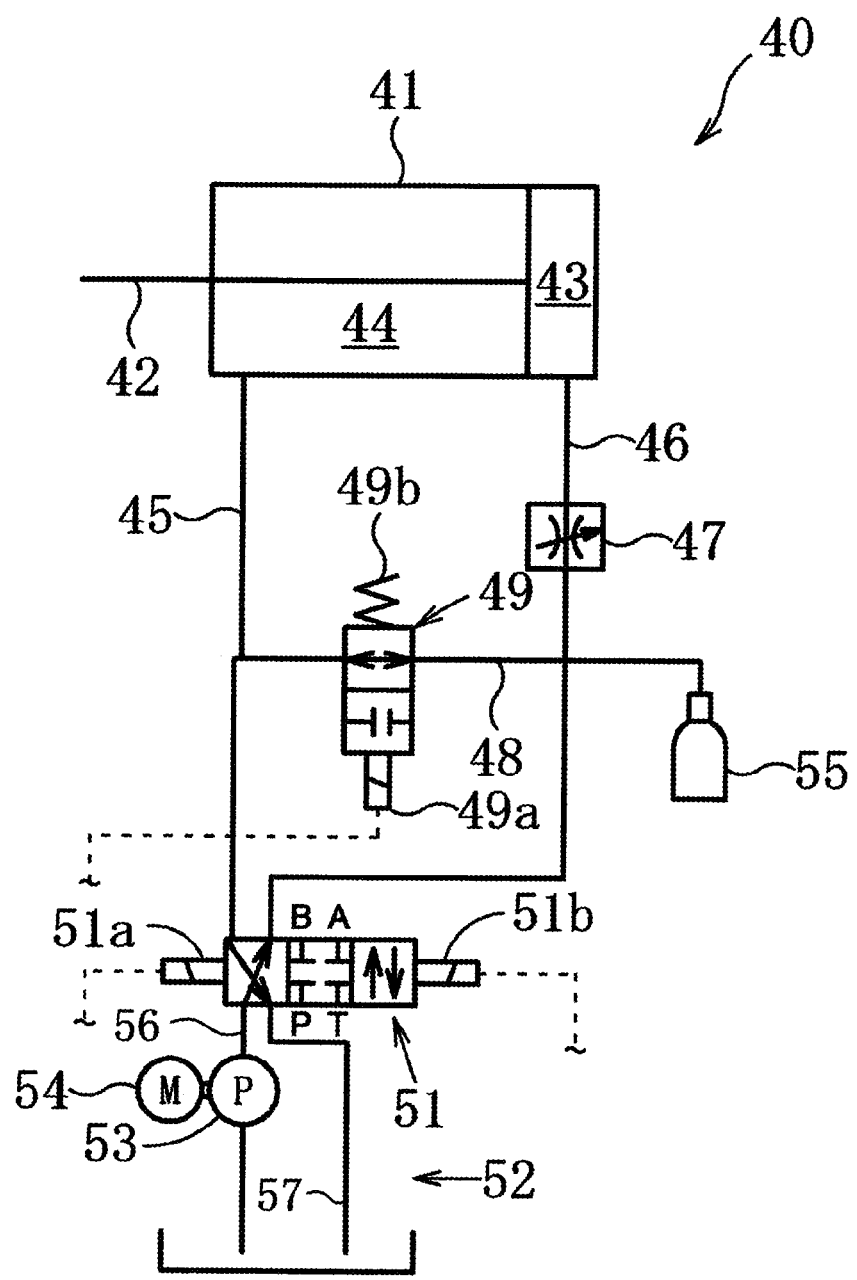
FIG. 7 is a hydraulic circuit diagram showing a tilting drive means of FIG. 6.

As shown in FIG. 7, the tilting drive device 40 includes the hydraulic cylinder 41, oil passages 45, 46, 56 and 57 and a connecting oil passage 48, an electromagnetic on-off valve 49, a variable throttle valve 47, an electromagnetic direction changeover valve 51, and an pressurized oil feed device 52. The pressurized oil feed device 52 includes a hydraulic pump 53 and a pump drive motor 54 configured to drive the hydraulic pump 53. The hydraulic cylinder 41 is a double-acting cylinder and includes a pair of piston oil chamber 43 and rod oil chamber 44. The pressurized oil ejected by the hydraulic pump 53 is fed to the oil chambers 43 and 44, causing the hydraulic cylinder 41 to be extended and contracted.

The oil passage 56 through which the pressurized oil ejected by the hydraulic pump 53 is guided is connected to P port of the electromagnetic direction changeover valve 51. The piston oil chamber 43 is connected to A port of the electromagnetic direction changeover valve 51 via the oil passage 46, while the rod oil chamber 44 is connected to B port via the oil passage 45. T port of the electromagnetic direction changeover valve 51 communicates with an oil reservoir 52 via the oil passage 57.

The electromagnetic direction changeover valve 51 is a three-position changeover valve and includes two solenoids 51a and 51b. In a state where the solenoids 51a and 51b are not energized, the electromagnetic direction changeover valve 51 is placed in a block position in which the A port and the B port are blocked. When the solenoid 51a is energized, the electromagnetic direction changeover valve 51 is placed in a right position in which the P port is connected to the A port and the T port is connected to the B port. In this case, the pressurized oil from the hydraulic pump 53 is fed to the piston oil chamber 43, and the rod 42 moves to an advanced position, causing the hydraulic cylinder 41 to be extended. When the solenoid 51b is energized, the electromagnetic direction changeover valve 51 is placed in a left position in which the P port is connected to the B port and the T port is connected to the A port. In this case, since the pressurized oil from the hydraulic pump 53 is fed to the rod oil chamber 44, the rod 42 moves to a retracted position, causing the hydraulic cylinder 41 to be contracted. Thus, using the electromagnetic direction changeover valve 51, feeding of the pressurized oil to the hydraulic cylinder 41 is controlled with a simple configuration.

The connecting oil passage 48 connects the oil passages 45 and 46. An electromagnetic on-off valve 49 is provided on the connecting oil passage 48. The electromagnetic on-off valve 49 is a normally open valve placed in an open position for opening the connecting oil passage 48, in a stationary state. Upon the solenoid 49a of the electromagnetic on-off valve 49 being energized, the electromagnetic on-off valve 49 operates against the force applied by the spring 49b and is placed in a closed position for disconnecting the connecting oil passage 48. A variable throttle valve 47 is provided on the oil passage 46 such that the variable throttle valve 47 is closer to the hydraulic cylinder 41 than the connecting oil passage 48. An accumulator 55 is connected to the oil passage 46. The accumulator 55 has a small volume for compensating for a volume difference between the oil pressure chambers 43 and 44.

Figure 8:
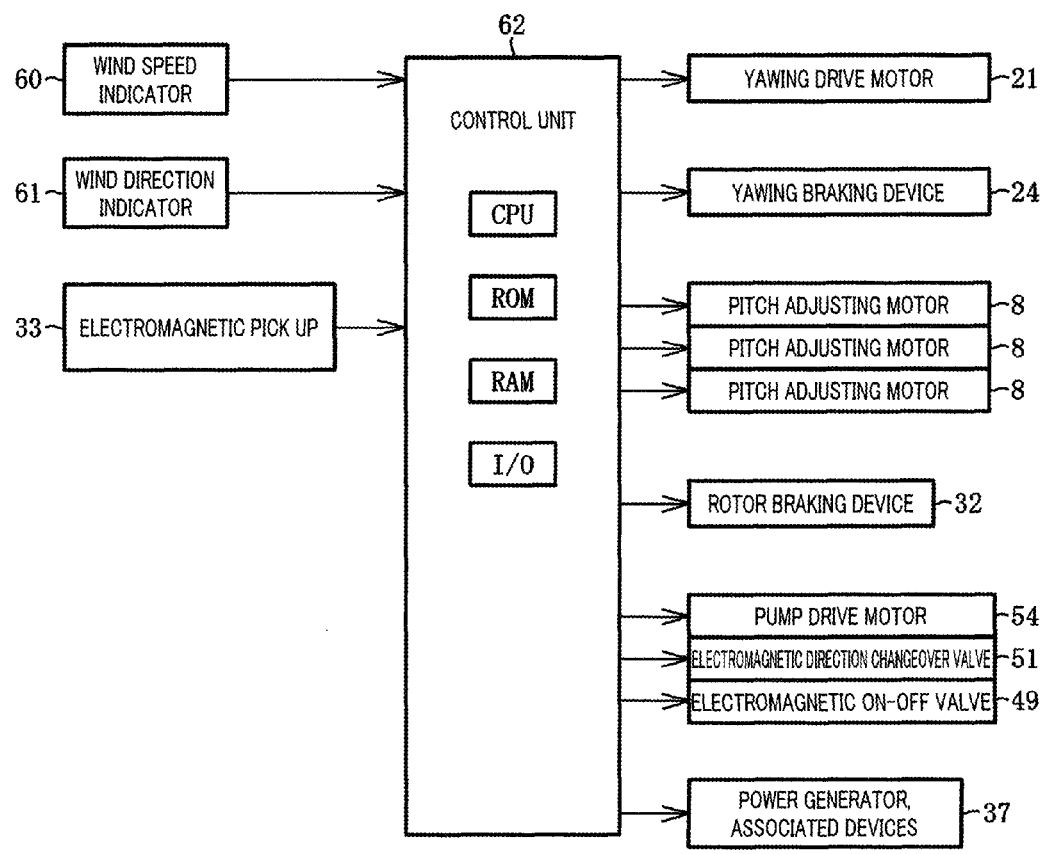
FIG. 8 is a block diagram showing a configuration of a control system of the upwind wind turbine of FIG. 1.

As shown in FIG. 8, the wind turbine includes a control unit 62 for executing overall control of the wind turbine. The control unit 62 includes a micro computer including a CPU, ROM and RAM, an input/output interface I/O connected to the microcomputer via a data bus, etc. The anemometer 60, the wind vane 61, the electromagnetic pickup 33, and others are electrically connected to the input interface. Plural drive circuits for driving the yawing drive motor 21, the yawing braking device 24, the pitch adjusting motors 8, the rotor braking device 32, the pump drive motor 54, the electromagnetic direction changeover valve 51, the electromagnetic on-off valve 49, the power generator 37 and associated devices, respectively, are provided at the output interface.

Next, the operation of the wind turbine 1 will be described with reference to FIGS. 6 to 8. The control unit 62 determines whether or not the wind speed detected by the anemometer 60 is not lower than a preset wind speed (e.g., cut-out wind speed). If it is determined that the detected wind speed is lower than the predetermined wind speed, the control unit 62 contracts the hydraulic cylinder 41 to place the blades 6 in the normal position, and performs a normal operation. During the normal operation, with the cylinder 41 contracted, the control unit 62 does not energize the solenoids 51a and 51b of the electromagnetic direction changeover valve 51 to place the electromagnetic direction changeover valve 51 in a block position, while the control unit 62 energizes the solenoid 49a of the electromagnetic on-off valve 49 to place the electromagnetic on-off valve 49 in a closed position. In addition, the control unit 62 actuates the yawing drive motor 21 based on the wind direction detected by the wind vane 61 to cause the nacelle 3 to yaw so that the blades 6 are directed upwind. As a result, the blades 6 rotate by a wind power or the like and the power generator 37 generates an electric power by the rotational driving force of the rotor 4. When the yawing drive motor 21 is actuated, the control unit 62 deactuates the yawing braking device 24 to permit the yawing of the nacelle 3. On the other hand, when the yawing drive motor 21 is not actuated, the control unit 62 actuates the yawing braking device 24 to brake the yawing of the nacelle 3, retaining a horizontal rotational position of the nacelle 3.

If it is determined that the wind speed is not lower than the predetermined wind speed, the control unit 62 switches the blades 6 from the normal position to the retracted position. First, the control unit 62 stops the rotor 4 in a predetermined rotational position in which the three blades 6 can tilt in a downwind direction to the retracted position without interference with the tower 2 based on an azimuth angle signal detected by the electromagnetic pickup 33. The predetermined rotational position is a rotational position in which the blades 6 do not overlap with the tower 2 when viewed from a rotational axis direction of the rotor 4, and is, for example, the position shown in FIG. 1.

When the rotation of the rotor 4 is stopped, first, the control unit 62 detects the predetermined rotational position based on the azimuth angle signal received from the electromagnetic pickup 33. Then, the control unit 62 actuates the three pitch adjusting motors 8 to increase pitch angles of the blades 6, thereby increasing air resistance in a rotational direction which is applied to the blades 6 to decrease the rotational speed of the blades 6. Then, the control unit 62 actuates the rotor braking device 32 to brake the rotor 4 and stops the three blades 6 in a predetermined rotational position based on the azimuth angle signal detected by the electromagnetic pickup 33. Alternatively, the pitch angles of the three blades 6 may be adjusted to be decreased to stop the rotation of the rotor 4.

Since the predetermined rotational position is detected based on the signal from the electromagnetic pickup 33 as described above, the rotor 4 can be surely stopped in the predetermined rotational position even under a strong wind. In addition, the wind turbine 1 includes the three pitch angle adjusting devices 7 in addition to the rotor braking device 32, as a rotation stop device 18 for stopping the rotation of the rotor 4. This makes it possible to quickly and surely stop the rotation of the rotor 4. Further, since the rotational speed of the rotor 4 is decreased by using the three pitch angle adjusting devices 7 and then the rotor controller 32 brakes the rotor 4, the rotor 4 can be stopped without imposing a great load on the rotor controller 32. As should be appreciated, since the rotor 4 is stopped when the wind speed is not lower than the predetermined wind speed, it is possible to prevent the rotor 4 from rotating at an excessively high speed under a strong wind, and to therefore prevent damage to the power generator 37.

After the rotor 4 is stopped, the control unit 62 actuates the tilting drive device 40 to cause the three blades 6 to tilt to the retracted position. In this case, the control unit 62 stops the energization of the solenoid 49a of the electromagnetic on-off valve 49 to place the electromagnetic on-off valve 49 in an open position and maintains a state where the solenoids 51a and 51b of the electromagnetic direction changeover valve 51 are not energized so that the electromagnetic direction changeover valve 51 is placed in the block position.

Under the above described states of the valves 49 and 51, the rod oil chamber 44 communicates with the piston oil chamber 43 via the oil passage 45, the connecting oil passage 48 and the oil passage 46, and the oil chambers 43 and 44 are disconnected from the hydraulic pump 53 and from the oil reservoir 52. For this reason, the pressurized oil flows from the rod oil chamber 44 to the piston oil chamber 43 by the wind load applied to the blades 6 and weights of the blades 6, and the hydraulic cylinder 41 is extended and the piston 42 moves forward to an advanced position. The operation of the valves 49 and 51 of the tilting drive device 40 causes the blades 6 to tilt to the retracted position based on the wind load applied to the blades 6 and the weights. In this case, the control unit 62 continues to actuate the rotor braking device 32 to maintain a state where the rotor 4 is stopped in the predetermined rotational position. The blades 4 can tilt without interference with the tower 2 and therefore will not be damaged.

Since the variable throttle valve 47 is provided on the oil passage 46, the amount of oil flowing between the rod oil chamber 44 and the piston oil chamber 43 is restricted and the operation speed of the hydraulic cylinder 41 is restricted. As a result, the tilting speed of the blades 6 can be suppressed to a low speed and damage to the blades 6 can be prevented.

In the state where the blades 6 are placed in the retracted position, a resultant force center G (see FIG. 2) of the wind load applied to the blades 6 is located at a downwind side relative to the center axis of the tower 2. Thus, the nacelle 3 automatically yaws correctly so that the front end portion of the rotor 4 faces upwind by the wind load applied to the three blades 3 under a strong wind, and the nacelle 4 and the rotor 4 automatically retain the upwind position. In this state, the control unit 62 deactuates the yawing braking device 24 and permits the nacelle 3 to automatically yaw. Thus, the nacelle 3 can automatically yaw smoothly.

Figure 9:
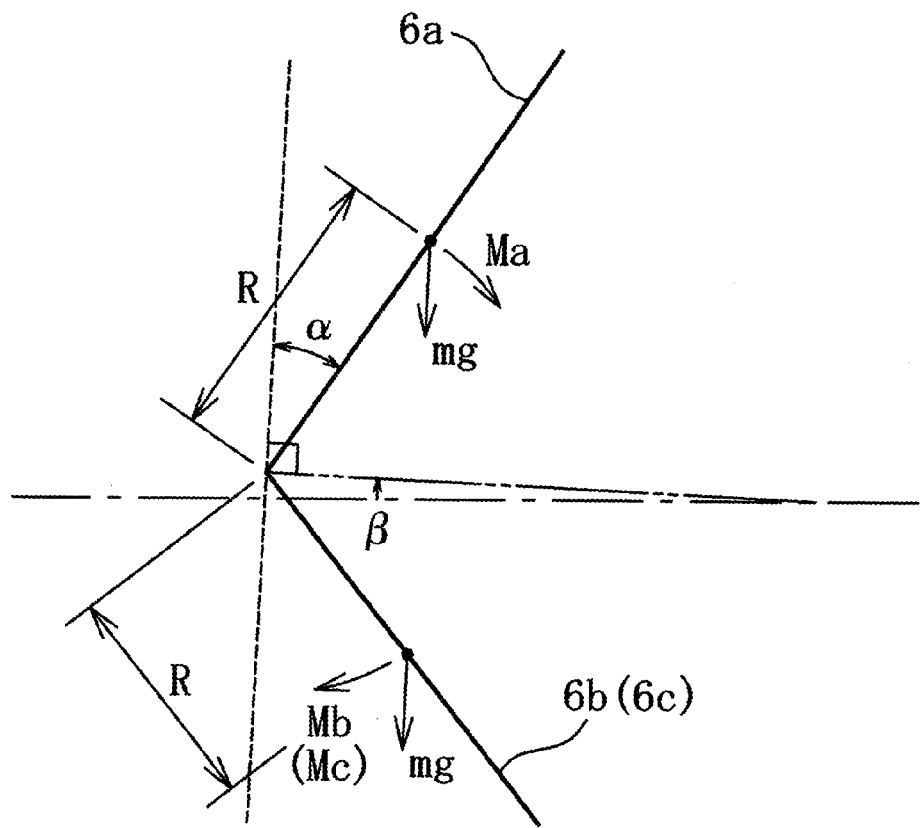
FIG. 9 is a view showing moments generated by the weights of blades of the upwind wind turbine of FIG. 1, in a state where the blades are placed in a retracted position.

As shown in FIG. 9, in the state where the blades 6 are placed in the retracted position, moments Ma, Mb, and Mc are generated in the blades 6a, 6b and 6c, respectively, because of the weights of the blades 6. As used herein, the blade (see FIG. 1 as well as FIG. 9) oriented in an upward direction is 6a, and two blades (see FIG. 1 as well as FIG. 9) oriented in a downward direction are 6b and 6c, a mass of the blade 6 is m, a gravitational acceleration is g, a distance from the pivot pin 10 to the center of gravity of each blade 6 is R, a tilting angle of the tilting position with respect to the normal position is a, a tilting angle of the center axis of the nacelle 3 with respect to a horizontal direction is β, and the moments acting on the blades 6 by their own weights are Ma, Mb and Mc, respectively.

When the tilting angle β is 0, Ma=R·mg·sin α, and Mb=Mc=−R·mg·sin α·sin 30 degrees=−(½) Ma. Ma indicates a moment for closing the blade 6a, and Mb and Mc indicate moments for opening the blades 6b and 6c, respectively. According to the relationship of these, when the tilting angle β is 0, the moment for closing the blade 6a, and the moments for opening the blades 6b and 6c are balanced, because the tilting coupling mechanism and the tilting drive device are configured to include the structure and oil pressure circuits for operating the blades 6 in association with each other.

Actually, the tilting angle β is not zero as described above, and the center axis of the nacelle 3 is tilted with respect to a horizontal direction such that the side at which the rotor 4 is mounted is oriented in an upward direction. In this case, the moment Ma for closing the blade 6a increases as the tilting angle β increases, while the moments Mb and Mc for opening the blades 6b and 6c, respectively, decrease as the tilting angle β increases. Under this condition, the above mentioned balance is lost, because of the above configuration of the tilting coupling mechanism and the tilting drive device, so that the moment for closing the blade 6a exceeds the moments for opening the blades 6b and 6c. In other words, the blades 6 are subjected to a force in a direction to close all of the blades 6. Thus, in this embodiment, the blades 6 tilt to the retracted position because of their own weights, and the tilted blades 6 retain the retracted position for themselves.

In accordance with the above described upwind wind turbine 1 of this embodiment, the blades 6 are configured to tilt to the retracted position if the wind speed is not lower than the predetermined wind speed. As a result, it is possible to significantly reduce the wind load applied to the three blades 6, improve a wind pressure resistance and prevent damage to the wind turbine 1, while a strong wind is blowing. Because the wind load applied to the blades 6 is thus reduced, restriction on the conditions for designing the wind turbine is eased, and it is not necessary to ensure rigidity and strength of the tower 2 so strictly in contrast to a conventional wind turbine. As a result, a manufacturing cost of the wind turbine 1 can be reduced.

It should be noted that the above configuration has an advantage in an operation in case of an electric power failure. To be specific, the electromagnetic on-off valve 49 is a normally open valve, and the electromagnetic direction changeover valve 51 is placed in a block position in a state where the solenoids 51 and 51b are not energized. For this reason, during the electric power failure, the electromagnetic on-off valve 49 is placed in the open position and the electromagnetic direction changeover valve 51 is placed in the block position. Therefore, during the electric power failure, the hydraulic cylinder 41 is actuated by utilizing the wind load applied to the blades 6 and the weights of the blades 6, enabling the three blades 3 to be switched to the retracted position, without using an auxiliary electric power supply such as a battery. In addition, in the state where the blades 6 are placed in the retracted position, the blades 6 automatically maintain the upwind position by the wind load. As a result, during the electric power failure, the position of the nacelle 3 and the position of the rotor 4 can be changed according to the wind direction without using an auxiliary electric power supply, such as a battery.

Next, an upwind wind turbine 1A according to Embodiment 2 of the present invention will be described. The same constituents as those in Embodiment 1 are designated by the same reference numerals and will not be described repetitively, but different constituents will be described.

Figure 10:
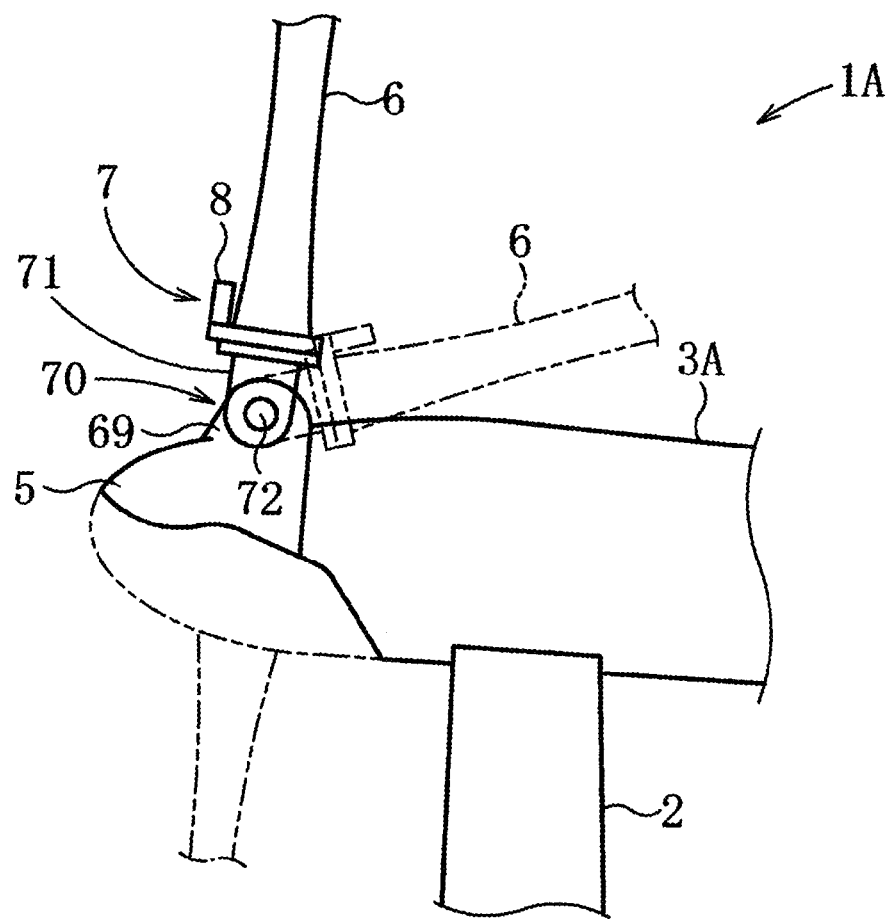
FIG. 10 is a partial side view of an upwind wind turbine according to Embodiment 2 of the present invention, showing major components as being enlarged.
Figure 11:
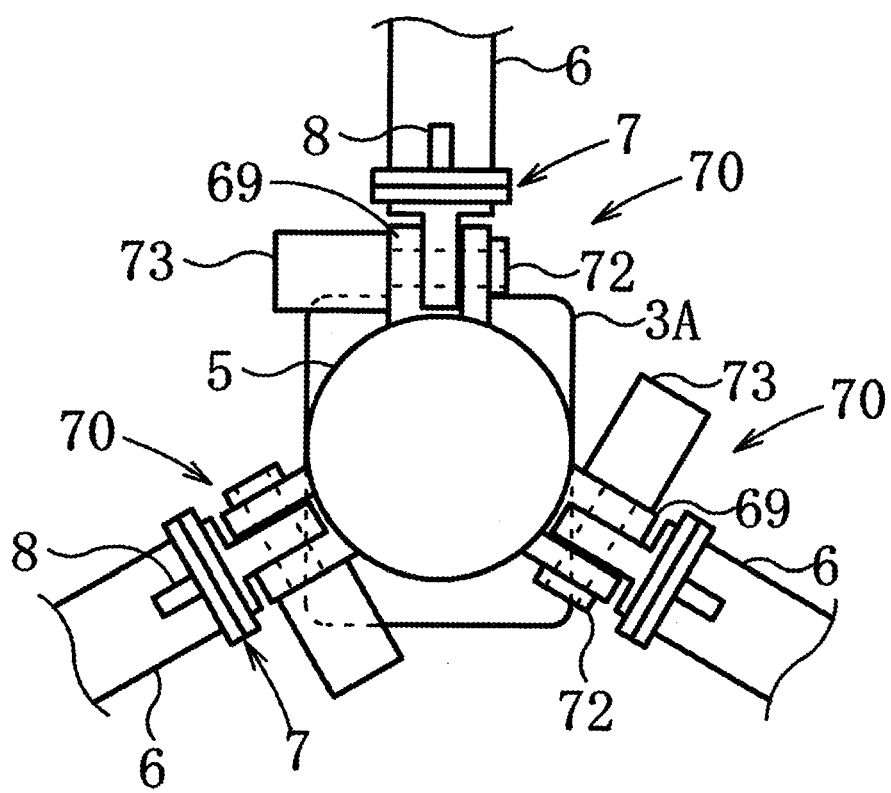
FIG. 11 is a partial front view of the upwind wind turbine, showing major components of the upwind wind turbine of FIG. 10 as being enlarged.

As shown in FIGS. 10 and 11, a tilting coupling mechanism 70 includes three pivot brackets 69, base end members 71 of the three blades 6 and three pivot pins 72. The pivot brackets 69 extend radially from the outer peripheral portion of the hub 5. The base end members 71 are coupled to the base end portions of the associated blades 6, respectively. The pivot brackets 69 and the base end members 71 are provided with insertion holes, respectively. The pivot pins 72 are inserted into the insertion holes and attached to the base end members 71, respectively. In this way, the base end members 71 are attached to the pivot brackets 69 such that the base end members 71 are rotatable integrally with the pivot pins 72, respectively. The tilting drive device includes three tilting drive motors 73 attached on the pivot brackets 69, respectively. The pivot pins 72 are fixedly attached to the output shafts of the tilting drive motors 73, respectively. When the control unit 62 drives the tilting drive motors 73, the base end members 71 rotate together with the pivot pins 72, respectively, thereby causing the three blades 63 to tilt between the normal position as indicated by a solid line of FIG. 10 and the retracted position as indicated by a two-dotted line of FIG. 10.

It should be noted that under a strong wind of a predetermined wind speed or higher, the blades 6 may be tilted to the retracted position at a low speed by a wind load while performing braking using the tilting drive motors 73. Alternatively, the blades 6 may be switched from the retracted position to the normal position, using the tilting drive motors 73. The upwind wind turbine 1A achieves substantially the same advantage as that of the wind turbine 1 of Embodiment 1. In addition, the configuration of the tilting coupling mechanism and the configuration of the tilting drive device are simplified, and as a result, a manufacturing cost of the wind turbine can be reduced as compared to Embodiment 1.

Figure 12:
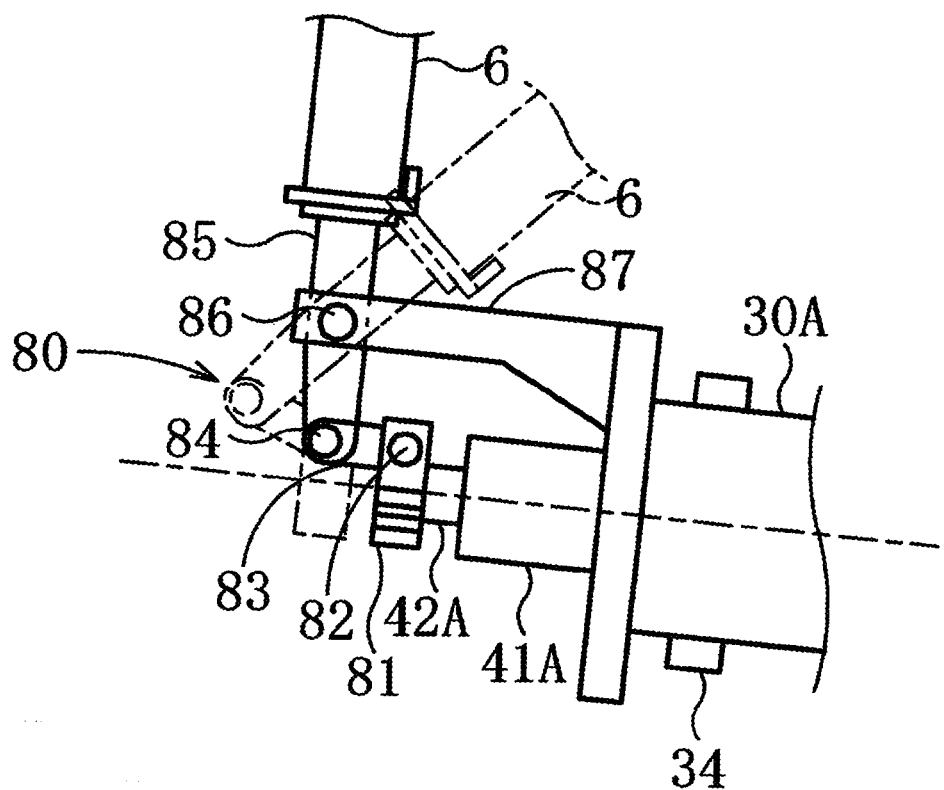
FIG. 12 is a side view showing a tilting coupling mechanism of an upwind wind turbine according to Embodiment 3 of the present invention.

Next, an upwind wind turbine according to Embodiment 3 of the present invention will be described with reference to FIG. 12. The same constituents as those in previous embodiments are designated by the same reference numerals and will not be described repetitively, but different constituents will be described. FIG. 12 shows only a tilting coupling mechanism 80 for the blade 6 in an uppermost position. The other tilting coupling mechanisms have a similar configuration.

As shown in FIG. 12, the tilting coupling mechanism 80 includes a Y-shaped member 81, a base end member 85 of each blade 6, a link member 83, a pair of arm members 87 and pivot pins 82, 84 and 86. The pair of arm members 87 are integral with the main shaft 30A and protrude from the front end of the main shaft 30A. The base end member 85 of each blade 6 is rotatably attached to the pair of arm members 87 via the pivot pin 86. One end portion of the link member 83 is coupled to the base end portion of the base end member 85 via the pivot pin 84 such that the link member 83 is rotatable. The other end portion of the link member 83 is coupled to one of end portions of the Y-shaped member 81 via the pivot pin 82 such that the link member 83 is rotatable. The Y-shaped member 81 is fixedly attached to the tip end portion of a piston rod 42A of a hydraulic cylinder 41A attached to the main shaft 30A.

With the hydraulic cylinder 41A being contracted, the blade 6 is in the normal position as indicated by a solid line of FIG. 12. When the piston rod 42A of the hydraulic cylinder 41 moves forward to an advanced position, the base end member 85 tilts around the pivot pin 86 via the link member 83, causing the blade 6 to be switched to the retracted position, as indicated by a two-dotted line of FIG. 12.

Figure 13:
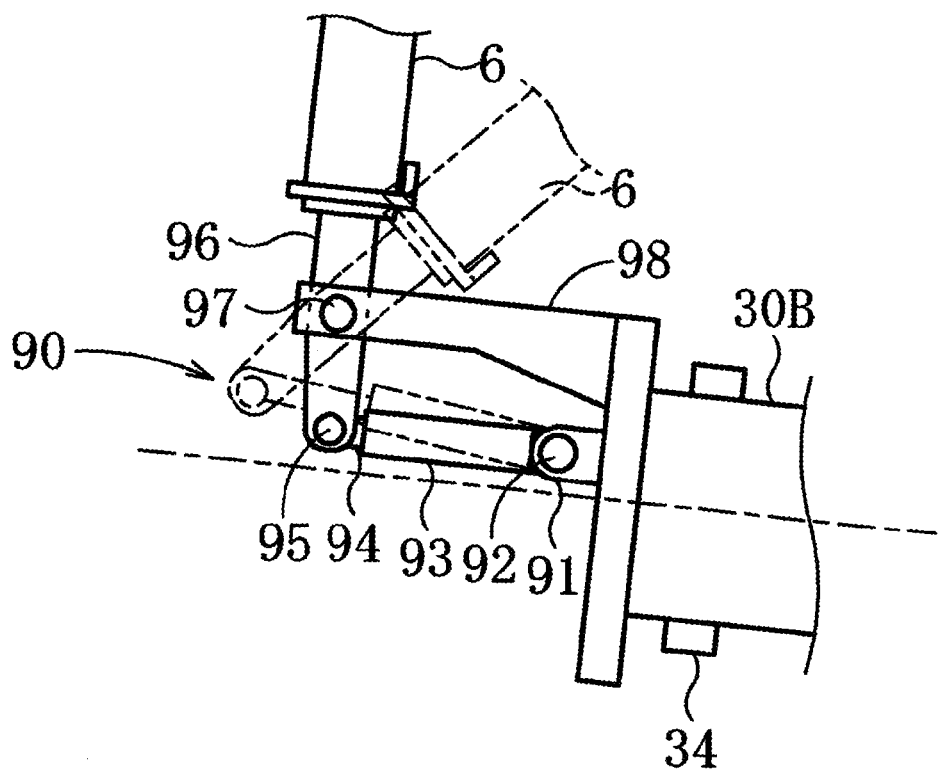
FIG. 13 is a side view showing a tilting coupling mechanism of an upwind wind turbine according to Embodiment 4 of the present invention.

Next, an upwind wind turbine 1 according to Embodiment 4 of the present invention will be described with reference to FIGS. 13 and 14. The same constituents as those in previous embodiments are designated by the same reference numerals and will not be described repetitively, but different constituents will be described. This upwind wind turbine is different from the upwind wind turbine of Embodiment 1 in the configuration of the tilting coupling mechanism 90 and the tilting drive device. To be specific, in this upwind wind turbine, three double-acting hydraulic cylinders 93 provided for the blades 6 cause the three blades 6 to tilt to the retracted position, respectively. FIG. 13 shows only a tilting coupling mechanism 90 for the blade 6 in an uppermost position. The other tilting coupling mechanisms have a similar configuration.

The tilting coupling mechanism 90 includes a pair of coupling members 91, pivot pins 92, hydraulic cylinders 93, base end members 96 of blades 6, pivot pins 95 and 97 and a pair of arm members 98. The pair of arm members 98 and the pair of coupling members 91 are integral with a main shaft 30B. The base end member 96 of each blade 6 is rotatably attached to the pair of arm members 98 via the pivot pin 97. The pair of coupling members 91 are provided on an inner diameter side of the main shaft relative to the pair of arm members 98. The head portion of each hydraulic cylinder 93 is coupled to the pair of coupling members 91 via the pivot pin 92 such that the hydraulic cylinder 93 is rotatable. The tip end portion of a piston rod 94 of the hydraulic cylinder 93 is coupled to the base end portion of the base end member 96 via the pivot pin 95 such that the piston rod 94 is rotatable.

As indicated by a two-dotted line of FIG. 13, when the piston rod 94 of the hydraulic cylinder 93 moves forward to an advanced position, the hydraulic cylinder 93 rotates in an upward direction around the pivot pin 92 and the blade 6 and the base end member 96 tilt around the pivot pin 97, thereby causing the blade 6 to be switched to the retracted position.

Figure 14:
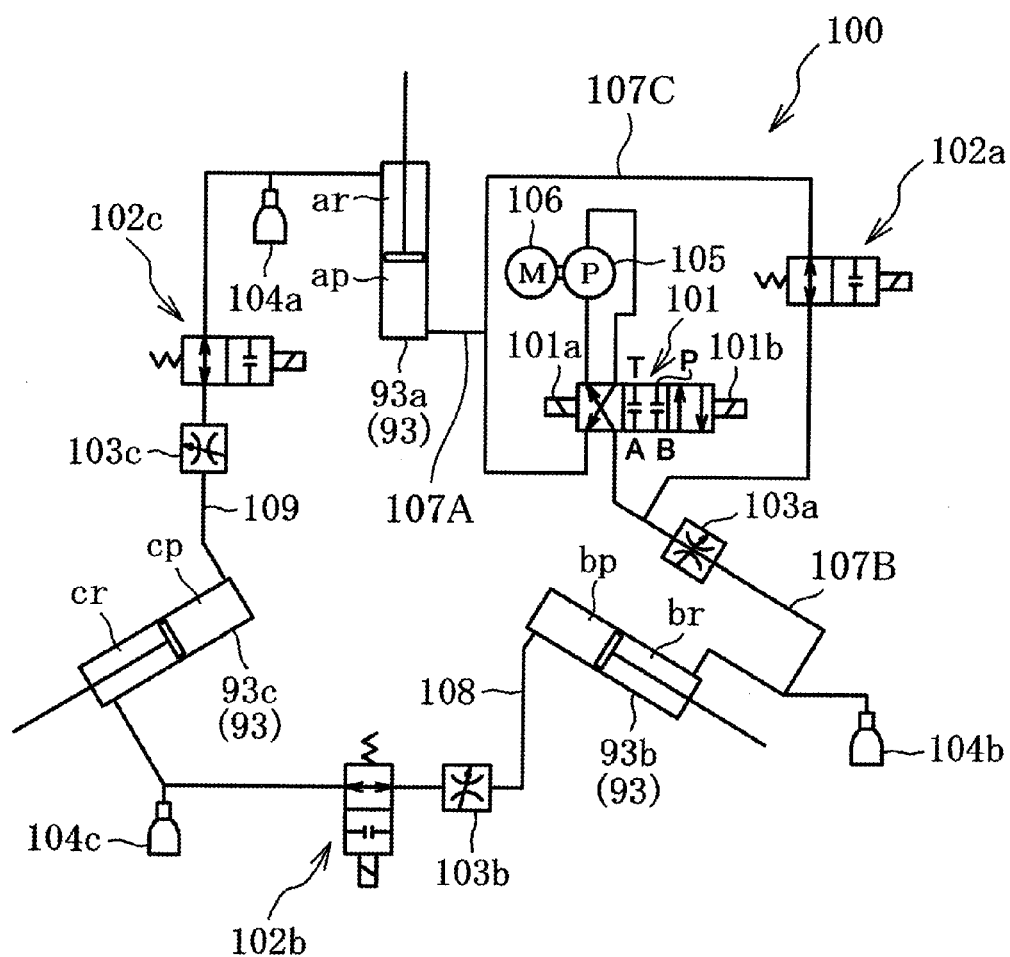
FIG. 14 is a hydraulic circuit diagram showing a tilting drive means of the upwind wind turbine of FIG. 13.

As shown in FIG. 14, the tilting drive device includes three hydraulic cylinders 93, a single hydraulic pump 105 and a synchronous operation circuit 100. In FIGS. 14, 93a, 93b and 93c designate hydraulic cylinders corresponding to the above described blades 6a, 6b and 6c, respectively, and ap, bp, and cp designate piston oil chambers of the hydraulic cylinders 93a, 93b and 93c, respectively, and ar, br and cr designate rod oil chambers of the hydraulic cylinders 93a, 93b and 93c, respectively. The synchronous operation circuit 100 is configured to actuate the three hydraulic cylinders 93a, 93b and 93c to cause the three blades 6a, 6b and 6c to be synchronously switched to the retracted position by the wind load applied to the three blades 6a, 6b and 6c, and the weights of the blades 6a, 6b and 6c.

A hydraulic pump 105 with a motor 106 is configured such that its eject port is connected to P port of an electromagnetic direction changeover valve 101 and its suction port is connected to T port of the electromagnetic direction changeover valve 101. The A port of the electromagnetic direction changeover valve 101 is connected to the oil chamber ap via an oil passage 107A, while the B port of the electromagnetic direction changeover valve 101 is connected to the oil chamber br via an oil passage 107B. That is, the oil passage 107A is connected to the oil passage 107B via a bypass oil passage 107C. An electromagnetic on-off valve 102a is provided on the bypass oil passage. The electromagnetic on-off valve 102a and the electromagnetic direction changeover valve 101 are connected in parallel with respect to the oil passages 107A and 107B. A variable throttle valve 103a is provided on the oil passage 107B at a position which is closer to the oil chamber br than the node between the oil passage 107B and the bypass oil passage 107C. The oil chamber ar is connected to the oil chamber cp via the oil passage 109, while the oil chamber cr is connected to the oil chamber by via the oil passage 108. An electromagnetic on-off valve 102c and a variable throttle valve 103c are provided on the oil passage 109. An electromagnetic on-off valve 102b and a variable throttle valve 103b are provided on the oil passage 108. The electromagnetic direction changeover valve 101 is similar to the electromagnetic direction changeover valve 51 shown in FIG. 7, while the electromagnetic on-off valves 102a, 102b and 102c are similar to the electromagnetic on-off valve 49 shown in FIG. 7. An accumulator 104b is connected to the oil passage 107B in a position near the oil chamber br. An accumulator 104c is connected to the oil passage 108 in a position near the oil chamber cr. An accumulator 104a is connected to the oil passage 109 in a position near the oil chamber ar. The accumulators 104a, 104b and 104c serve to compensate for a volume difference between the piston oil chambers ap, by and cp and the rod oil chambers ar, br and cr and have a relatively small volume.

When a strong wind is blowing, the blades 6a to 6c are switched to the retracted position in such a manner that the electromagnetic direction changeover valve 101 is placed in a block position and all of the electromagnetic on-off valves 102a, 102b and 102c are opened. Thereby, because of the wind load applied to the blades 6a, 6b and 6c and the moments Ma, Mb, and Mc shown in FIG. 9, the blades 6a, 6b and 6c start to tilt, so that a pressurized oil flows from the oil chamber ar to the oil chamber cp via the oil passage 109, the pressurized oil flows from the oil chamber cr to the oil chamber by via the oil passage 108, the pressurized oil flows from the oil chamber br to the oil chamber ap via the oil passage 107B, the bypass oil passage 107C and the oil passage 107A. As a result, the three blades 6a, 6b and 6c tilt automatically synchronously and are switched to the retracted position. This is due to the fact that the moment Ma cancels the moments Mb and Mc. It should be noted that since the variable throttle valves 103a, 103b and 103c restrict the flow rate of the oil flowing through the oil passages 107A, 107B, 107C, 108 and 109, the operation speeds of the three hydraulic cylinders 93a, 93b and 93c are restricted and the three blades 6a, 6b and 6c tilt at a low speed. This operation occurs in a similar manner during an electric power failure.

When the strong wind stops, the blades 6a, 6b and 6c are switched to the normal position in such a manner that only the electromagnetic on-off valve 102a is closed, the remaining two electromagnetic on-off valves 102b and 102c are opened, the solenoid 101a of the electromagnetic direction changeover valve 101 is turned OFF and the solenoid 101b of the electromagnetic direction changeover valve 101 is turned ON, and the motor 106 drives the hydraulic pump 105, the oil flows from the oil chamber ap to the oil chamber br, the oil flows from the oil chamber by to the oil chamber cr, and the oil flows from the oil chamber cp to the oil chamber ar. Therefore, the three hydraulic cylinders 93a, 93b and 93c are driven to retract the piston rods, causing the three blades 6a, 6b and 6c to be switched to the normal position. Alternatively, the three blades 6a, 6b and 6c may be switched to the retracted position by a reversed operation to the above operation, using the hydraulic pump 105 and the electromagnetic direction changeover valve 101.

Next, an upwind wind turbine 1 according to Embodiment 5 of the present invention will be described with reference to FIGS. 15 to 17. The same constituents as those in previous embodiments are designated by the same reference numerals and will not be described repetitively, but different constituents will be described. A tilting coupling mechanism 190 of this upwind wind turbine is different from that of Embodiment 4 in a shape of an arm member 198 and a configuration of a hydraulic cylinder 193.

Figure 15:
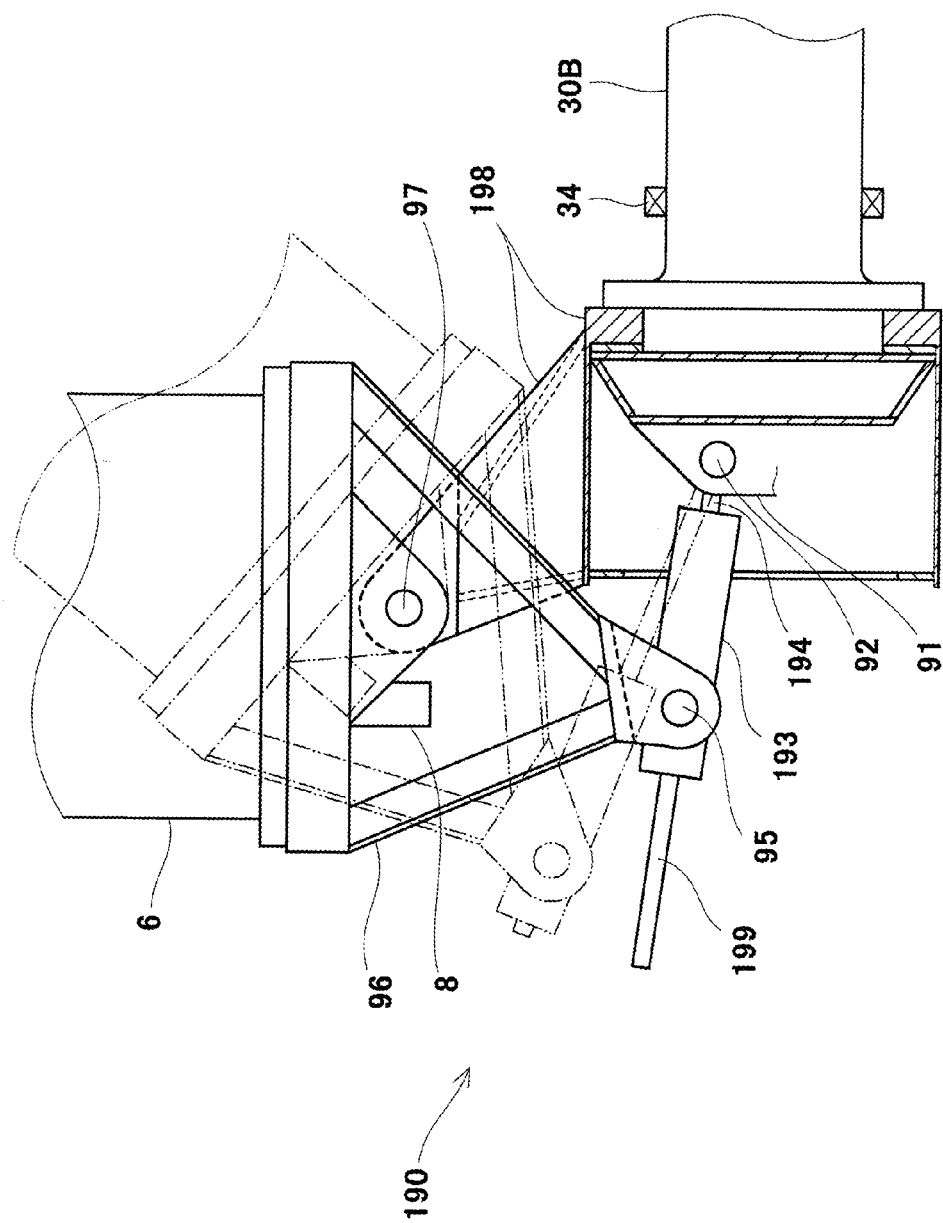
FIG. 15 is a side view showing a tilting coupling mechanism of an upwind wind turbine according to Embodiment 5 of the present invention.
Figure 16:
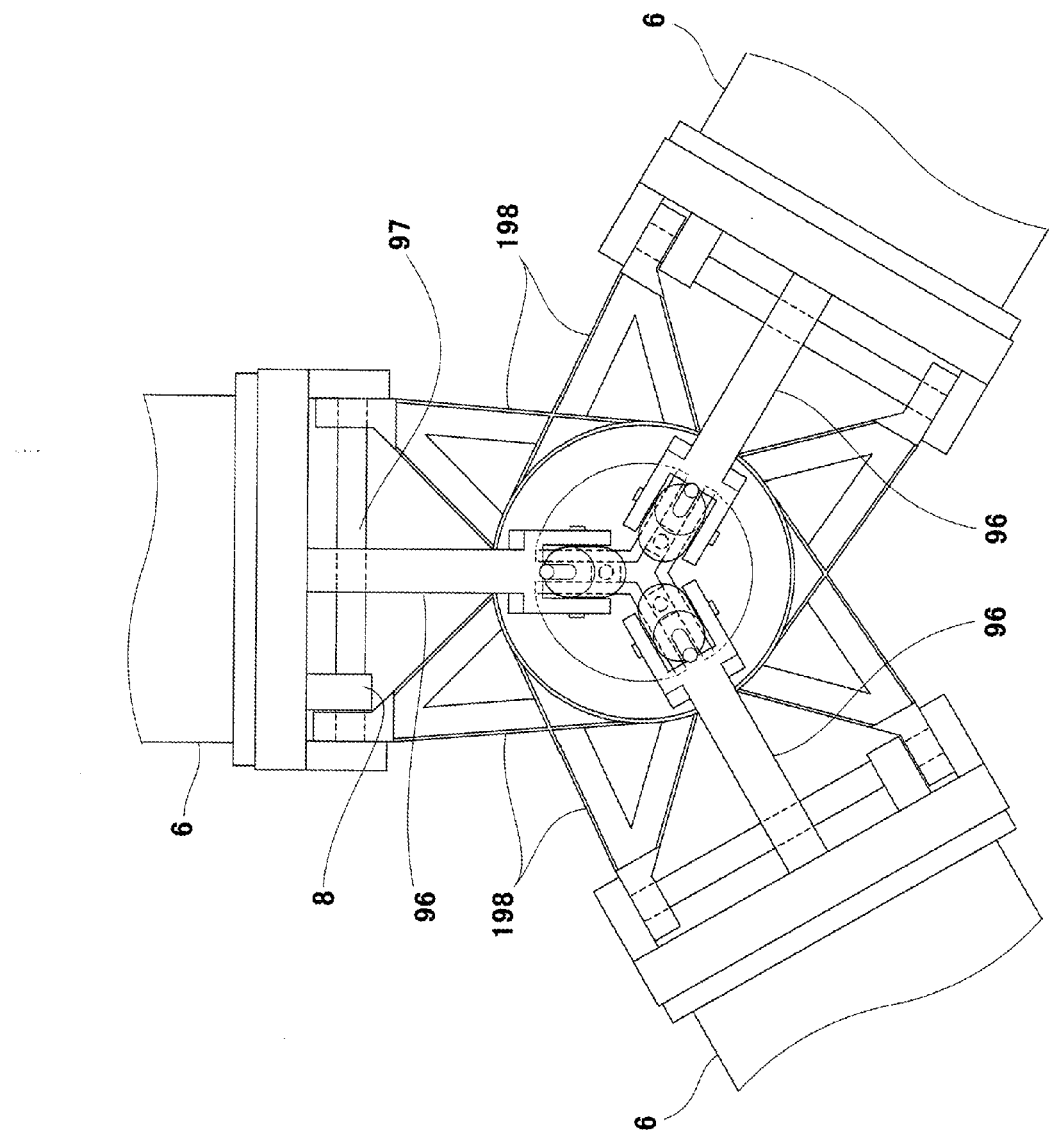
FIG. 16 is a front view of the tilting coupling mechanism of FIG. 15.
Figure 17:
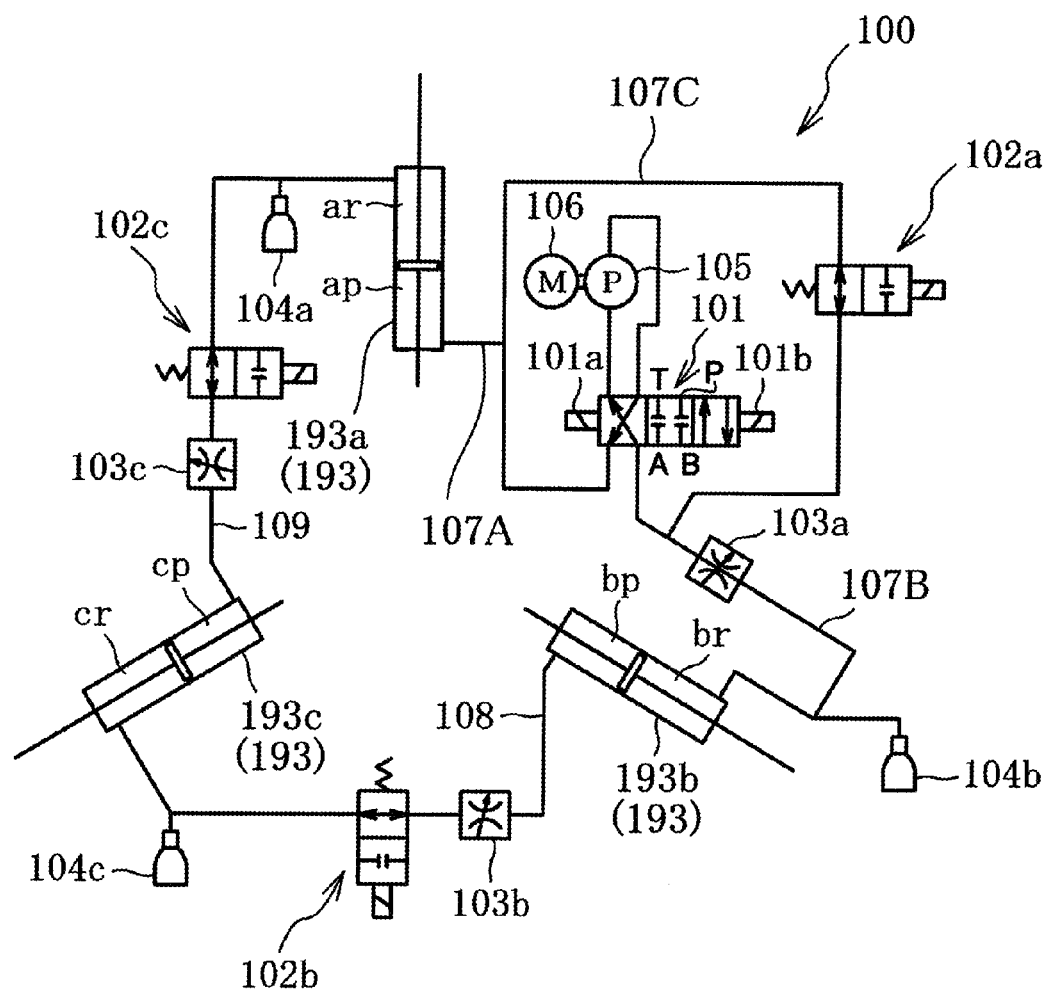
FIG. 17 is a hydraulic circuit diagram showing a tilting drive means of the upwind wind turbine of FIG. 15.

As shown in FIGS. 15 and 16, the arm member 198 has a shape in which three pivot brackets protrude from a cylindrical structure. Since the pivot brackets protrude from the cylindrical structure, the weight of the arm member 198 can be reduced and the manufacturing cost can be reduced. As shown in FIGS. 15 and 17, each of the three hydraulic cylinders 193a, 193b and 193c is a two-rod cylinder having two rods 194 and 199 (see FIG. 15). This eliminates a volume difference between the piston oil chambers ap, by and cp shown in FIG. 17 and the rod oil chambers ar, br and cr show in FIG. 17. And, the advanced positions to which the rods of the three hydraulic cylinders 193a, 193b and 193c move conform to each other, the retracted positions to which the rods of the three hydraulic cylinders 193a, 193b and 193c move conform to each other, and the three blades 6a, 6b and 6c can tilt at an equal tilting angle with ease.

Next, a modification of the above embodiments will be described. The number of the blades 6 in the upwind wind turbine 1 is not limited to three but may be two or more. When it is determined that the wind speed is not lower than the predetermined speed, a part of the blades 6 may be switched to the retraced position, rather than all of the blades 6. A blade 6 including the base end member may be changed from a normal position in which the blade 6 is located within an operation plane to a retracted position in which the blade 6 tilts by an angle according to a wind speed to a parallel position in which the blade 6 is substantially parallel to the nacelle.

A wind speed other than the cut-out wind speed may be preset and each blade 6 may be switched to the retracted position based on the set wind speed. The variable throttle valve 47 may be provided in the first oil passage 45 instead of the second oil passage 46.

In a state where the three blades 6 are switched to the retracted position, the control unit 62 may actuate the yawing braking device 24 to brake the yawing of the nacelle 3, 3A. In this case, the control unit 62 may be configured to drive the yawing drive motor 21 based on the wind direction detected by the wind vane 61 to cause the nacelle 3, 3A to yaw so that the front end of the hub 5 faces the wind.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

The invention claimed is:

1. An upwind wind turbine including a nacelle horizontally rotatably attached to a tower; a rotor rotatably attached to the nacelle; a hub which is provided at a center portion of the rotor and forms a part of the rotor; a plurality of blades which are attached to the hub, form a part of the rotor and are rotatable within a substantially vertical operation plane; and a yawing drive device configured to yaw the nacelle to direct the blades upwind, the upwind wind turbine comprising:
    a tilting coupling mechanism configured to couple base end portions of the blades to the hub such that the blades tilt between a normal position in which the blades are present within the operation plane and a retracted position in which the blades are tilted in a downwind direction relative to the normal position;

a tilting drive means configured to operate in association with the tilting coupling mechanism to switch positions of the blades;
a rotation stop means configured to stop rotation of the rotor; and
a control means configured to actuate the rotation stop means to stop the rotor in a predetermined rotational position in which the blades tilt without interference with the tower and to actuate the tilting drive means to tilt the blades to the retracted position after stop of rotation of the rotor, to switch the blades to the retracted position.

2. The upwind wind turbine according to claim 1, further comprising:
an anemometer means configured to detect a wind speed;
wherein the control means is configured to start control for switching the blades to the retracted position when it is determined that the wind speed detected by the anemometer means is not lower than a predetermined wind speed.

3. The upwind wind turbine according to claim 1, further comprising:
an azimuth angle detector means configured to detect an azimuth angle of the rotor;
wherein the control means is configured to detect the predetermined rotational position based on the azimuth angle detected by the azimuth angle detector means and to actuate the rotation stop means to stop the rotation of the rotor.

4. The upwind wind turbine according to claim 1, wherein the rotation stop means includes a pitch angle adjusting means for each of the blades and a rotor braking means configured to brake the rotor.

5. The upwind wind turbine according to claim 4, wherein, to stop the rotation of the rotor, the control means is configured to actuate the pitch angle adjusting means to adjust pitch angles of the blades to decrease rotational speeds of the blades and to then actuate the rotor braking means to brake the rotor to stop the rotation of the rotor.

6. The upwind wind turbine according to claim 1, wherein the control means is configured to actuate the tilting drive means to tilt the blades by a wind load applied to the blades and weights of the blades to tilt the blades to the retracted position.

7. The upwind wind turbine according to claim 1, wherein in a state where the blades are placed in the retracted position, a resultant force center of a wind load applied to the plurality of blades is located downwind relative to a center axis of the tower.

8. The upwind wind turbine according to claim 1, further comprising:
a yawing braking means configured to brake yawing of the nacelle; wherein
the control means is configured to deactuate the yawing braking means in a state where the blades have reached the refracted position.

9. The upwind wind turbine according to claim 1, wherein the tilting drive means includes a single double-acting hydraulic cylinder configured to be extended and contracted to tilt the plurality of blades, a first oil passage and a second oil passage which are connected to a pair of oil chambers of the hydraulic cylinder, respectively, a connecting oil passage connecting the first oil passage to the second oil passage, and an electromagnetic on-off valve provided in the connecting oil passage.

10. The upwind wind turbine according to claim 9, wherein the electromagnetic on-off valve is a normally-open valve.

11. The upwind wind turbine according to claim 10, wherein
the tilting drive means includes a variable throttle valve provided in the first oil passage or the second oil passage.

12. The upwind wind turbine according to claim 9, wherein
the tilting drive means includes a pressurized oil feed device configured to feed a pressurized oil and an electromagnetic direction changeover valve connected to the pressurized oil feed device; and
wherein the first oil passage and the second oil passage are connected to the electromagnetic direction changeover valve.

13. The upwind wind turbine according to claim 1, wherein
the tilting drive means includes a plurality of double-acting hydraulic cylinders which are configured to be extended and contracted to tilt the associated blades, respectively, and a synchronous operation means configured to synchronously operate the plurality of hydraulic cylinders to cause the blades to be synchronously switched to the retracted position by a wind load applied to the blades and by weights of the blades.

14. The upwind wind turbine according to claim 13, wherein
the tilting drive means includes a hydraulic pump configured to feed a pressurized oil and an electromagnetic direction changeover valve provided between the hydraulic pump and the synchronous operation means.

15. The upwind wind turbine according to claim 1, further comprising:
a power generator configured to generate an electric power by a rotational driving force of the rotor.

16. A method of operating an upwind wind turbine including a nacelle horizontally rotatably attached to a tower; a rotor rotatably attached to the nacelle; a hub which is provided at a center portion of the rotor and forms a part of the rotor; a plurality of blades which are attached to the hub, form a part of the rotor and are rotatable within a substantially vertical operation plane; and a yawing drive device configured to yaw the nacelle to direct the blades upwind, wherein base end portions of the blades are coupled to the hub such that the blades tilt between a normal position in which the blades are present within the operation plane and a retracted position in which the blades are tilted in a downwind direction relative to the normal position; the method comprising the steps of:
stopping the rotor in a predetermined rotational position in which the blades tilt in a downwind direction without interference with the tower; and
tilting the blades to the refracted position after the stopping of the rotation of the rotor.

17. The method of operating the upwind wind turbine according to claim 16, wherein the upwind wind turbine is configured such that a resultant force center of a wind load applied to the plurality of blades is located downwind relative to a center axis of the tower, after the step for tilting the blades.

18. The method of operating the upwind wind turbine according to claim 16,
wherein the upwind wind turbine includes a yawing braking means configured to brake yawing of the nacelle; the method further comprising:
deactuating the yawing braking means after the tilting of the blades.

\* \* \* \* \*